United States Patent [19]

Seigel

[11] Patent Number: 5,514,859
[45] Date of Patent: May 7, 1996

[54] POWER AND DATA INTERFACE FOR PERIPHERAL DEVICES

[75] Inventor: Jeremy Seigel, Bellevue, Wash.

[73] Assignee: Seagull Scientific Systems, Inc., Bellevue, Wash.

[21] Appl. No.: 422,696

[22] Filed: Apr. 14, 1995

Related U.S. Application Data

[62] Division of Ser. No. 190,297, Feb. 2, 1994, which is a division of Ser. No. 592,212, Oct. 3, 1990, Pat. No. 5,313,642.

[51] Int. Cl.⁶ ..................................................... G06K 7/10
[52] U.S. Cl. ........................ 235/462; 235/449; 395/750
[58] Field of Search ................................... 235/449, 462, 235/472; 395/750

[56] References Cited

U.S. PATENT DOCUMENTS

| | | | |
|---|---|---|---|
| 3,735,350 | 5/1973 | Lemelson | 235/472 |
| 3,925,639 | 12/1975 | Hester | 235/472 |
| 4,072,859 | 2/1978 | McWaters | 250/568 X |
| 4,091,270 | 5/1978 | Musch et al. | 235/419 |
| 4,160,156 | 7/1979 | Sherer | 235/463 |
| 4,282,426 | 8/1981 | Neseem et al. | 235/463 |
| 4,312,035 | 1/1982 | Greene | 395/750 |
| 4,379,224 | 4/1983 | Engstrom | 235/463 |
| 4,387,297 | 6/1983 | Swartz et al. | 235/472 X |
| 4,457,016 | 6/1984 | Pfeffer | 235/472 X |
| 4,471,218 | 9/1984 | Culp | 235/472 |
| 4,517,455 | 5/1985 | Benitez, III et al. | 235/463 |
| 4,521,677 | 6/1985 | Sarwin | 235/385 |
| 4,535,204 | 8/1985 | Hughes et al. | 235/462 |
| 4,550,247 | 10/1985 | Winter et al. | 235/472 |
| 4,578,533 | 3/1986 | Pierce | 379/93 |
| 4,642,459 | 2/1987 | Caswell et al. | 250/227.13 |
| 4,656,463 | 4/1987 | Anders et al. | 340/572 |
| 4,682,015 | 7/1987 | Quan | 235/472 |
| 4,703,473 | 10/1987 | Caine et al. | 370/15 |
| 4,710,616 | 12/1987 | Utley | 235/472 |
| 4,723,269 | 2/1988 | Summerlin | 379/102 |
| 4,761,544 | 8/1988 | Poland | 235/462 |
| 4,794,592 | 12/1988 | Caine et al. | 370/85.1 |
| 4,816,660 | 3/1989 | Swartz et al. | 235/472 |
| 4,825,058 | 4/1989 | Poland | 235/472 |
| 4,866,602 | 9/1989 | Hall | 395/821 |
| 4,876,460 | 10/1989 | Johnson | 307/64 |
| 4,884,287 | 11/1989 | Jones et al. | 375/377 |
| 4,894,522 | 1/1990 | Elliott | 235/472 |
| 4,902,883 | 2/1990 | Poland | 235/462 |
| 4,933,538 | 6/1990 | Heiman et al. | 235/462 |
| 5,029,034 | 7/1991 | Weiley | 360/132 |
| 5,034,598 | 7/1991 | Poland | 235/435 |
| 5,122,644 | 6/1992 | Hasegawa et al. | 235/462 |
| 5,167,024 | 11/1992 | Smith et al. | 395/375 |
| 5,179,375 | 1/1993 | Dick et al. | 340/825.51 |
| 5,202,825 | 4/1993 | Miller et al. | 364/405 |
| 5,216,595 | 6/1993 | Protheroe | 364/412 |
| 5,243,485 | 9/1993 | Weiley | 360/132 |
| 5,309,351 | 5/1994 | McCain et al. | 364/132 |
| 5,313,642 | 5/1994 | Seigel | 395/750 |

OTHER PUBLICATIONS

"Softwedge" product flyer, MTS Marketing, Technology & Sales, single sheet, undated.

*Primary Examiner*—Donald T. Hajec
*Assistant Examiner*—Steven Wigmore
*Attorney, Agent, or Firm*—Ronald M. Anderson

[57] ABSTRACT

An interface (12) is disclosed for coupling a peripheral device (18) to the serial port (14) of a computer (16). in one application, the interface allows the serial port to provide the power required by a scanner for operation. To reduce power consumption, the scanner is typically operated in either/a reduced-power, nonscanning mode or a higher power scanning mode. The interface may include an energy storage device (36) for storing energy from the serial port when the scanner is operated in the nonscanning mode and providing energy to the scanner when it is operated in the scanning mode. Thus, a scanner that requires more power than the serial port can provide at any one time can be used. The interface also includes a shutdown circuit (46) that prevents the scanner from being operated in conditions that might lead to the erroneous interpretation of data. Further, an input leakage isolation circuit (48) is included to prevent the discharge of the storage device when the scanner is not in use.

7 Claims, 6 Drawing Sheets

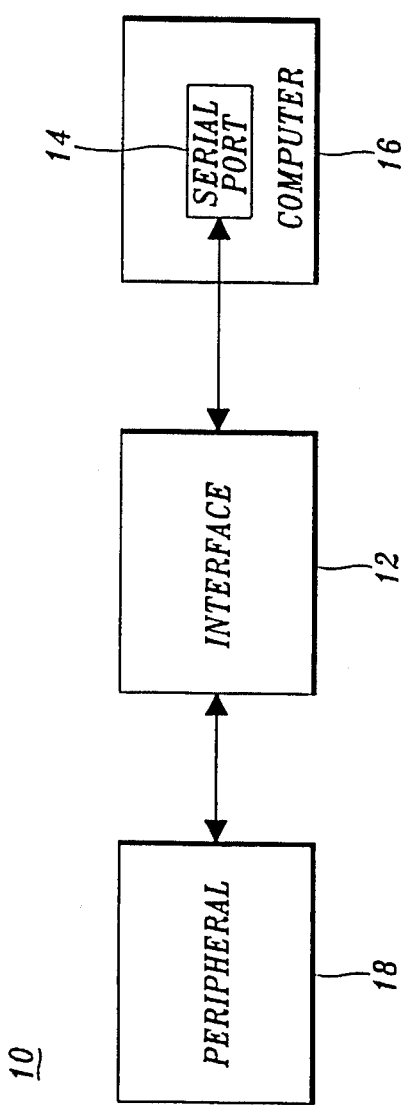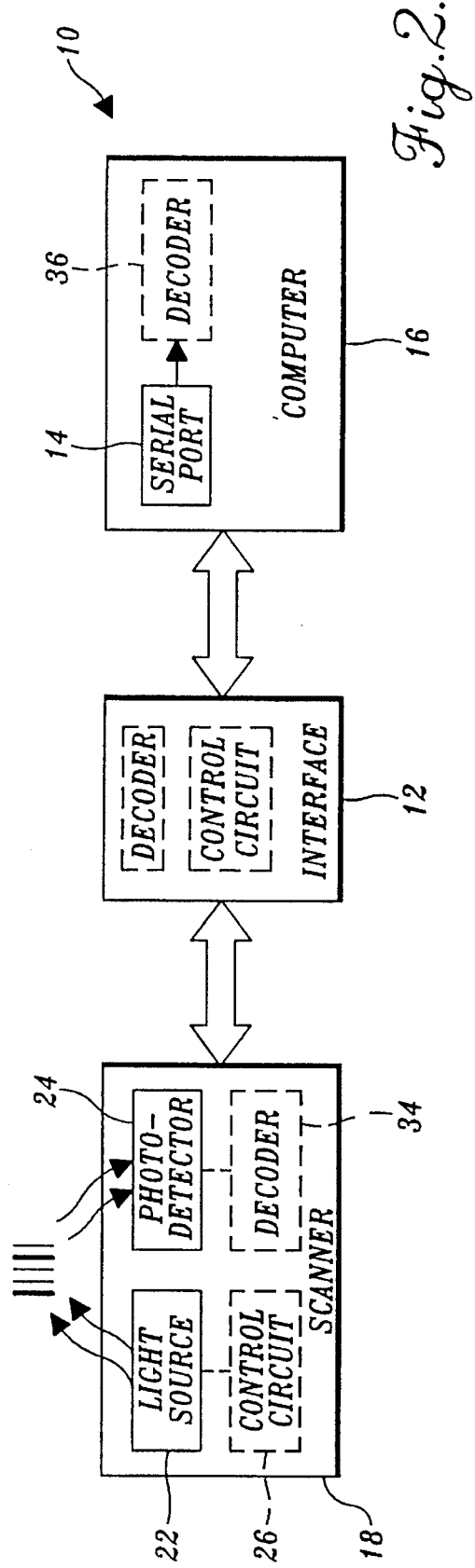

POWER AND DATA INTERFACE FOR PERIPHERAL DEVICES

This application is a divisional application, based on prior application Ser. No. 08/190,297, filed Feb. 2, 1994, which in turn is a divisional of prior application Ser. No. 07/592,212, now U.S. Pat. No. 5,313,642 filed Oct. 3, 1990, the benefit of the filing dates of which are hereby claimed under 35 USC §120.

FIELD OF THE INVENTION

This invention relates generally to peripheral devices for use with computers and, more particularly, to the powering of such peripheral devices.

BACKGROUND OF THE INVENTION

A wide variety of peripheral devices have been developed for use with computers. In that regard, many peripheral devices, such as magnetic stripe readers and mice, are used to provide information to a host computer. Other peripheral devices, such as printers and monitors, are used to process the output of the host computer. Nearly all such peripheral devices, however, require some form of power for proper operation.

One particular type of peripheral device of interest is used with a host computer to process bar codes. A bar code is a sequence of alternating bars and spaces that is typically applied to a product or its packaging. The bar code contains information about the product in a form that can be quickly and easily processed by specially designed bar code "readers."

Usually, the widths of the various bars and spaces determine the information "encoded" in the bar code. For example, this approach is widely employed in a format known as the Universal Product Code (UPC). Typically, the bar code identifies the product and further processing is required to associate additional information, such as price and inventory data, with the product.

As noted above, the information contained in a bar code is "decoded" by a bar code reader. Bar code readers perform two basic functions. First, the bar code reader produces an electrical signal having at least one parameter that varies with the width of the bars and spaces in the bar code. Typically, this parameter is the duration of alternating low and high signal intervals associated with the bars and spaces.

The second function of the bar code reader is the decoding of the electrical signal. For example, the durations of the alternating low and high signal intervals are analyzed to determine which characters the signal and, hence, bar code represents.

To accomplish these functions, conventional bar code readers include an optical scanner and a decoder. The scanner includes a light source and photodetector that may, for example, be physically moved across the bar code by an operator. The light source sequentially illuminates the bars and spaces being scanned. The photodetector, in turn, produces an electrical output whose magnitude is proportional to the light reflected. Because the bars generally absorb light, while the spaces generally reflect light, the photodetector output alternates between high and low intervals, with the duration of each interval being a function of the width of the corresponding bar or space scanned.

The decoder typically includes both hardware and software components that cooperatively perform several functions. First, the decoder processes the photodetector output to determine the relative widths of the bars and spaces in the bar code scanned. Then, the decoder uses this coded information, along with the correlations between bar and space widths and character coding for the bar code symbology adopted, to decode the character message encoded into the bar code.

In the preceding discussion, a bar code reader is described as including both a scanner and a decoder. As will be appreciated, however, the decoding operation can be performed either independently of, or on board, the scanner. Thus, for the purposes of this document, the term "scanner" will be understood to encompass devices responsible for scanning, regardless of whether they are also responsible for decoding.

Having briefly reviewed the operation of bar code readers or scanners, one particular aspect of peripheral operation, the supply of peripheral power, will now be considered in greater detail. In that regard, using bar code scanners again for illustrative purposes, the power requirements of such scanners have been met in a variety of different ways.

For example, scanner power is often provided externally. In that regard, when decoding is performed remotely from the scanner, the decoder may include a power source designed specifically to power the decoder and the scanner. This power source may be, for example, a battery or a regulated supply. While the use of external power in this manner reduces the size and weight of the scanner, it requires a specially designed decoder power supply.

As an alternative, a power source, such as a battery, could be included as part of the scanner. The use of a battery, however, has several disadvantages. First, a battery may increase the weight and size of the scanner. In addition, a battery is typically able to operate the scanner for only limited periods before replacement or recharging is required.

A number of techniques have also been suggested for reducing the power requirements of the scanner. In that regard, the power applied to the light source on the scanner may be controlled to minimize power consumption. For example, this may be accomplished by reducing the light source drive level. However, the reduced light levels may not be accurately detected by the photodetector, potentially having an adverse effect on the accuracy of bar code reading. To overcome this limitation, the duty cycle of the light source may instead be controlled. Specifically, the light source can be turned off or operated at a low duty cycle when the scanner is not being used to scan. As a result, the light source's power requirements during that time are reduced.

Even with the scanner's power requirements reduced, however, some power source is still required. Thus, a specially designed external source is needed to provide the requisite power or the scanner's weight and size are increased by the addition of an on-board power source.

As will be appreciated, the power requirements of other peripheral devices have also been met in a variety of ways. As the trend toward portability in the computer field continues, however, a growing emphasis will be placed on the need to power peripherals without increasing the peripherals' weight and without requiring specially designed external sources. In view of these observations, it would be desirable to provide a peripheral interface that allows a conventional peripheral device to be externally powered from another conventional device.

SUMMARY OF THE INVENTION

In accordance with this invention, an interface for coupling the serial port of a computer to a peripheral device that requires energy is disclosed. The interface includes a transmission element, for transferring energy from the serial port of the computer, and also includes a storage device, coupled to the transmission element, for storing energy. The serial port is capable of providing a source amount of power. In one arrangement, the peripheral device is operable in a first mode requiring less than the source amount of power and in a second mode requiring more than the source amount of power. The storage device stores energy from the serial port when the peripheral device is operated in the first mode and provides energy to the peripheral device when the peripheral device is operated In the second mode.

A shutdown circuit inhibits the transfer of energy from the serial port to the peripheral device unless the serial port and the storage device are able to cooperatively provide enough power to the peripheral device to properly operate it in the second mode. Similarly, an isolation circuit is included to isolate the storage device from input and output leakage paths in response to at least one of a plurality of predetermined conditions. The peripheral device powered may be, for example, a bar cede scanner or a magnetic stripe reader.

BRIEF DESCRIPTION OF THE DRAWINGS

The invention will presently be described in greater detail, by way of example, with reference to the accompanying drawings, wherein:

FIG. 1 is a block diagram of a system constructed in accordance with this invention, including a peripheral device, interface, serial port, and computer;

FIG. 2 is a more detailed block diagram of the system of FIG. 1, illustrating, in particular, features of the computer and a bar code scanner employed as the peripheral;

DETAILED DESCRIPTION OF THE INVENTION

Figure 3:
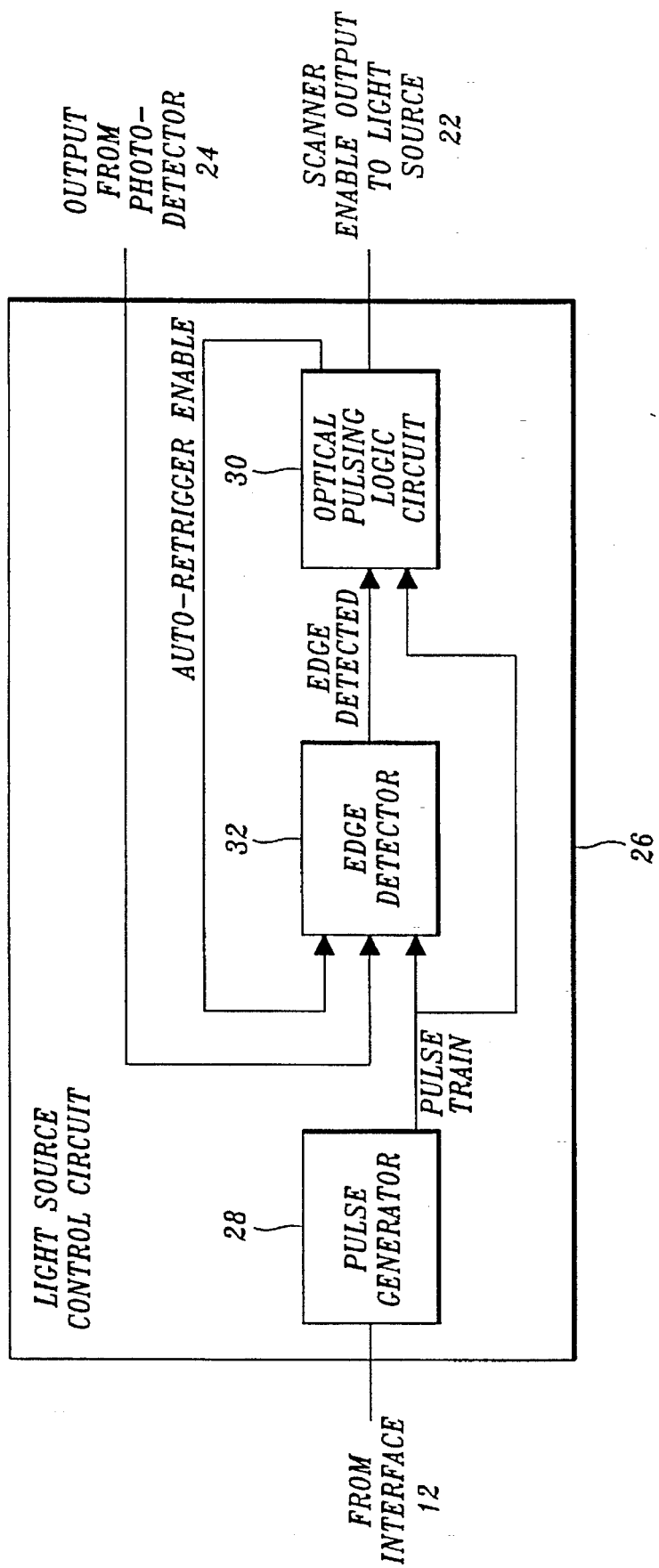
FIG. 3 is a block diagram of a light control circuit, which may be included in the bar code scanner of FIG. 2.

Referring now to FIG. 1, a computer-based system 10 is shown. The system 10 includes an interface 12 constructed in accordance with this invention. As will be described in greater detail below, the interface 12 performs a number of functions.

In that regard, interface 12 provides power from the serial port 14 of a computer 16 to a peripheral 18. The interface 12 is designed to allow the use of a peripheral 18 that requires more power during at least some modes of operation than is available from serial port 14 at any one time. In addition, the interface 12 regulates the operation of the peripheral 18 to ensure that peripheral 18 is used only if adequate power is available, as well as to increase the likelihood that adequate power will be available. Finally, the interface 12 transfers signals between peripheral 18 and the computer 16.

Addressing now the various components of system 10 in greater detail, as will be appreciated, peripheral 18 can be any one of a variety of devices. Although other peripherals will be discussed in greater detail below, in the embodiment shown in FIG. 2, the peripheral 18 is a bar code scanner that includes a light source 22 and photodetector 24. Although other devices such as a laser diode or laser tube could be employed, the light source 22 is preferably a light-emitting diode (LED) because of the LED's suitable emission characteristics and low power requirements. The light source 22 is positioned adjacent a scanning region of the scanner 18 to allow bar codes to be illuminated when the scanner 18 is moved across them.

The photodetector 24 may be any one of a variety of devices that produce an electrical output in response to radiant energy, including, for example, photoconductive cells, photoresistors and phototransistors. The photodetector 24 is typically positioned adjacent light source 22 to receive light from source 22 after it is reflected by the spaces in the bar code. The output of photodetector 24 is then a train of electrical pulses whose magnitude and duration are a function of the reflected light.

Although light source 22 may be left ON when the scanner 18 is not being used to scan bar codes, the operation of light source 22 is preferably controlled during such nonscanning intervals to reduce the scanner's power requirements. To that end, a light source control circuit 26 may be included in scanner 18 or, as will be described in greater detail below, in interface 12.

The simplest and currently adopted form of light source control circuit is a manual switch 26 connected between interface 12 and light source 22. The operator simply actuates switch 26 to turn light source 22 ON prior to scanning and OFF Immediately after scanning is complete. As a result, the power requirements of scanner 18 are substantially eliminated during the nonscanning mode of operation.

An alternative to the use of a manual switch is some form of automatic light control circuit 26. In addition to reducing the power requirements of the scanner 18, such an automatic circuit 26 must be able to detect the initiation and termination of a bar code scan. Although the automatic light control circuit 26 may be constructed in a variety of ways, one arrangement periodically energizes light source 22 during the nonscanning mode of operation and monitors the output of photodetector 24 for a transition indicative of the initiation of a bar code scan. When a transition is detected, the light source 22 is then kept ON for an interval of time sufficient to complete scanning of the bar code.

Figure 4:
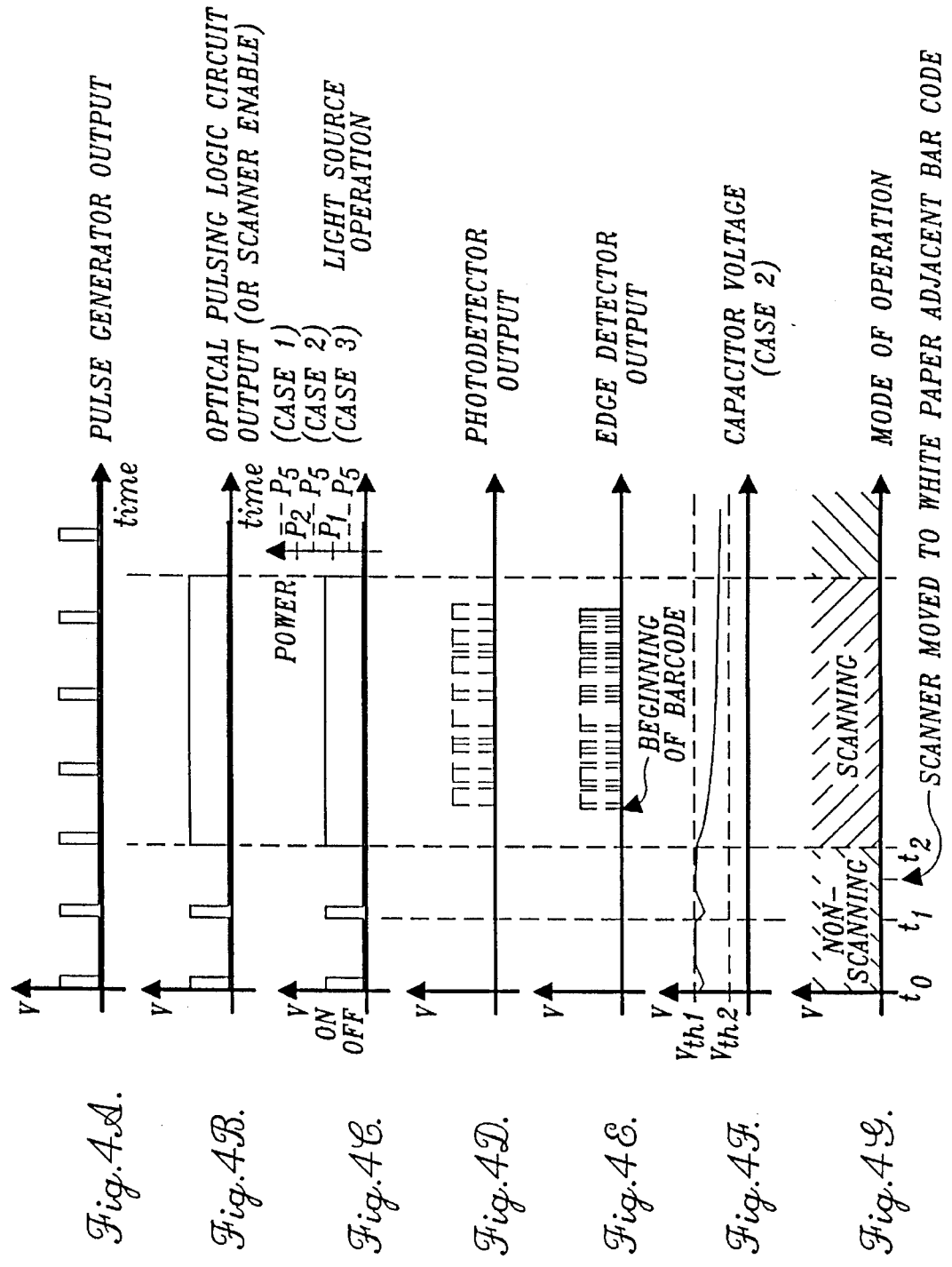
FIGS. 4A through 4G illustrate the relationship between the operation of the bar code scanner and various components of the interface, referenced to a common time frame.

Referring now to FIG. 3, an automatic light control circuit 26 operable in this manner is shown. As shown, the automatic light control circuit 26 includes a pulse generator 28, optical pulsing logic circuit 30, and an edge detector 32. These components cooperatively control the operation of light source 22 and photodetector 24 in the following manner. The pulse generator 28 produces a train of electrical pulses of short duration as shown in FIG. 4A. This pulse train is applied to the optical pulsing logic circuit 30 and the edge detector 32.

The optical pulsing logic circuit 30 responds to the pulse train by providing a "scanner enable" output to the light source 22. When scanner 18 is in the nonscanning mode of operation, the scanner enable output, shown in FIG. 4B, is identical to the pulse generator output. Thus, the light source 22 is turned ON and OFF at the same frequency as the pulse train produced by pulse generator 28. The operation of light source 22 is shown graphically in FIG. 4C.

Assuming that the light source 22 and photodetector 24 of scanner 18 are not positioned adjacent a reflective surface prior to scanning, the photodetector 24 does not respond to the energization of light source 22 when the scanner 18 is in the nonscanning mode of operation, as shown at times $t_0$ and $t_1$ in FIG. 4D. For example, with the scanner 18 held in free space prior to use, no reflections will be received by photodetector 24. If the scanner 18 is then placed on a reflective surface, such as the white paper adjacent the beginning of the bar code to be scanned, the next energization of light source 22 at time $t_2$ will cause the output of photodetector 24 to undergo a transition, as shown at time $t_2$ in FIG. 4D.

The edge detector 32 samples the output of scanner 18 to detect such transitions in the following manner. To allow the output of photodetector 24 to stabilize after the light source 22 has been energized, the samples of the photodetector's output are preferably taken near the end of the time during which light source 22 is energized, for example, at the falling edge of the enable pulse provided by circuit 30 to light source 22. Edge detector 32 then compares the output of photodetector 24 during consecutive samples. Any black-to-white or white-to-black transitions occurring in the field that photodetector 24 is exposed to between energization of light source 22 will cause the photodetector 24 output to undergo a high-to-low or low-to-high transition. The edge detector 32 responds to either or both types of such transitions by producing an "edge detected" output, shown in FIG. 4E, that is applied to the optical pulsing logic circuit 30.

Logic circuit 30, in turn, responds to the edge-detected output by generating a wand-enable pulse of sufficient duration to allow the bar code to be scanned under most circumstances (beginning at time $t_2$ in FIG. 4B). Thus, the scanner 18 will enter a scanning mode of operation, as shown in FIG. 4G, and the light source 22 will remain ON at time $t_2$ in FIG. 4C, rather than being pulsed at the output frequency of the pulse generator 28. With the light source 22 left ON, the output of photodetector 24, shown in FIG. 4D, will now comprise a sequence of high and low intervals, the duration of which corresponds to the width of the bars and spaces scanned.

To help ensure that the light source 22 is kept ON for a sufficient duration to complete scanning, when the output of photodetector 24 indicates that the first edge of the bar code has been scanned, the edge detector 32 and optical pulsing logic circuit 30 cooperatively produce and respond to an "automatic retrigger enable" signal. This signal automatically retrigger the longer duration wand-enable pulse produced by the optical pulsing logic circuit 30 for each black-to-white bar code edge that is detected. As a result, the light source 22 will be certain to remain ON the entire length of the bar code and will, in fact, stay ON for a brief interval after scanning is completed.

The final component of scanner 18 to be considered is the decoder 34, shown in FIG. 2. For the purpose of the ensuing discussion, however, the location of the decoder 34, like that of the light source control circuit 26, in system 10 is not important. In that regard, as described below, the decoder may alternatively be included in the interface 12 or computer 16.

The decoder 34 is a microprocessor-based device that receives the photodetector 24 output, which is a train of electrical pulses corresponding to the bars and spaces of the bar code scanned. Decoder 34 then determines the duration of the various signal intervals and employs a protocol stored, for example, in firm-ware or battery-backed random-access memory to identify the alphanumeric characters encoded by the bar code. The decoder 34 provides an output to interface 12 that is electrically, optically, or audibly encoded in any one of a number of character-encoding formats, such as the the American Standard Code for Information Exchange (ASCII) format. If, on the other hand, the decoder 34 is not included on scanner 18, the unformatted pulse train output by photodetector 24 will be applied directly to interface 12.

The computer 16 may be, for example, a personal computer (PC) of the type produced by the International Business Machine Company (IBM), or some other compatible disk-operating system (DOS) based computer. The computer 16 may, for example, be a standard desktop machine or a portable or laptop device. The computer 16 is responsible for performing a variety of functions, including the control and interpretation of the scanner output. For example, if computer 16 receives decoded information from interface 12 identifying the product to which the bar code being scanned is attached, computer 16 can then access its memory and software to identify other product parameters, such as price and inventory.

As noted above, the computer 16 may include a decoder 36, as an alternative to the inclusion of a decoder in interface 12 or scanner 18. In this preferred implementation, the input to computer 16 is not in a character-encoded format but is rather a string of pulses representative of the bars and spaces scanned. The decoder 36 then decodes the product information contained in the scanner 18 output and makes it available to the computer 16 in the particular character-encoding format employed.

As previously discussed, conventional serial communication bar code readers perform both scanning and decoding of bar codes. The decoded characters are then transmitted from the reader to the serial port of the host computer in the particular character encoding format used.

In contrast, with the decoding function performed by a decoder 36 in computer 16, the serial port 14 is used as a direct input/output (I/O) connection between the computer 16 and the combination of scanner 18 and interface 12. In that regard, the unformatted pulse train output of scanner 18 is directly applied to an input handshaking line of serial port 14. The decoder 36, which may be, for example, a software driver resident in the memory of computer 16, then responds to an output of scanner 18 representative of a color change in the material being scanned by scanner 18 and records the timing values of the various bars and spaces in the bar code being scanned. As will be appreciated, by delegating responsibility for decoding to a decoder 36 in computer 16, the cost and complexity of the scanner 18 and interface 12 are advantageously kept low.

Turning now to a discussion of serial port 14, the serial port 14 may be mounted on an input/output (I/O) board or the mother board of computer 16. The serial port 14 may be used with a wide variety of equipment, including serial printers, asynchronous modems, and mice. The serial port 14 is most often employed in an RS-232 configuration.

The serial port 14 is controlled by, for example, software resident in computer 16. In that regard, the resident software sets and leaves the serial port's output handshaking lines high for use as a power source, as will be described in greater detail below. In addition, the software polls one of the serial port's input handshaking lines so that data, such as the timing information from an undecoded pulse train output by photodetector 24, can be received.

In the RS-232 configuration, serial port 14 may include a conventional 25-pin or 9-pin serial connector in which different pins are assigned the following inputs: chassis ground, transmit data (TXD), receive data (RXD), request to send (RTS), clear, to send (CTS), data set ready (DSR), signal ground, carrier detect (CD), data terminal ready (DTR), and ring indicate (RI). The TXD pin and corresponding line of serial port 14 are normally used to provide signal outputs from serial port 14 to a peripheral device, while the RTS and DTR pins and corresponding lines of serial port 14 are used for output handshaking. Similarly, the RXD pin and corresponding line of serial port 14 are normally used to provide signal inputs to serial port 14 from a peripheral device, while the CTS and DSR pins and corresponding lines of serial port 14 are used for input handshaking.

As will be described in greater detail below, in accordance with the present invention, the milliampere-level current sourced by the TXD pin is conditioned to provide an "on-board" negative rail voltage, and the currents sourced by the RTS and DTR pins are conditioned to provide an on-board positive rail voltage, from serial port 14 to the interface 12 and scanner 18. In addition, the outputs of the TXD, RTS, and DTR pins can be analyzed by interface 12 to determine whether serial port 14 has been reconfigured by computer 16, or whether the computer 16 has been turned off or the interface 12 disconnected. The RXD, CTS, DSR, CD, and RI pins of port 14 are used to provide data from interface 12 to computer 16. More particularly, if decoding is performed by the computer 16, the unformatted pulse train produced by the photodetector is applied to the CTS, DSR, CD, or RI pin. On the other hand, the RXD pin is relied upon to transmit data in the applicable character-encoded format when decoding is performed at the scanner 18 or interface 12.

Figure 5:
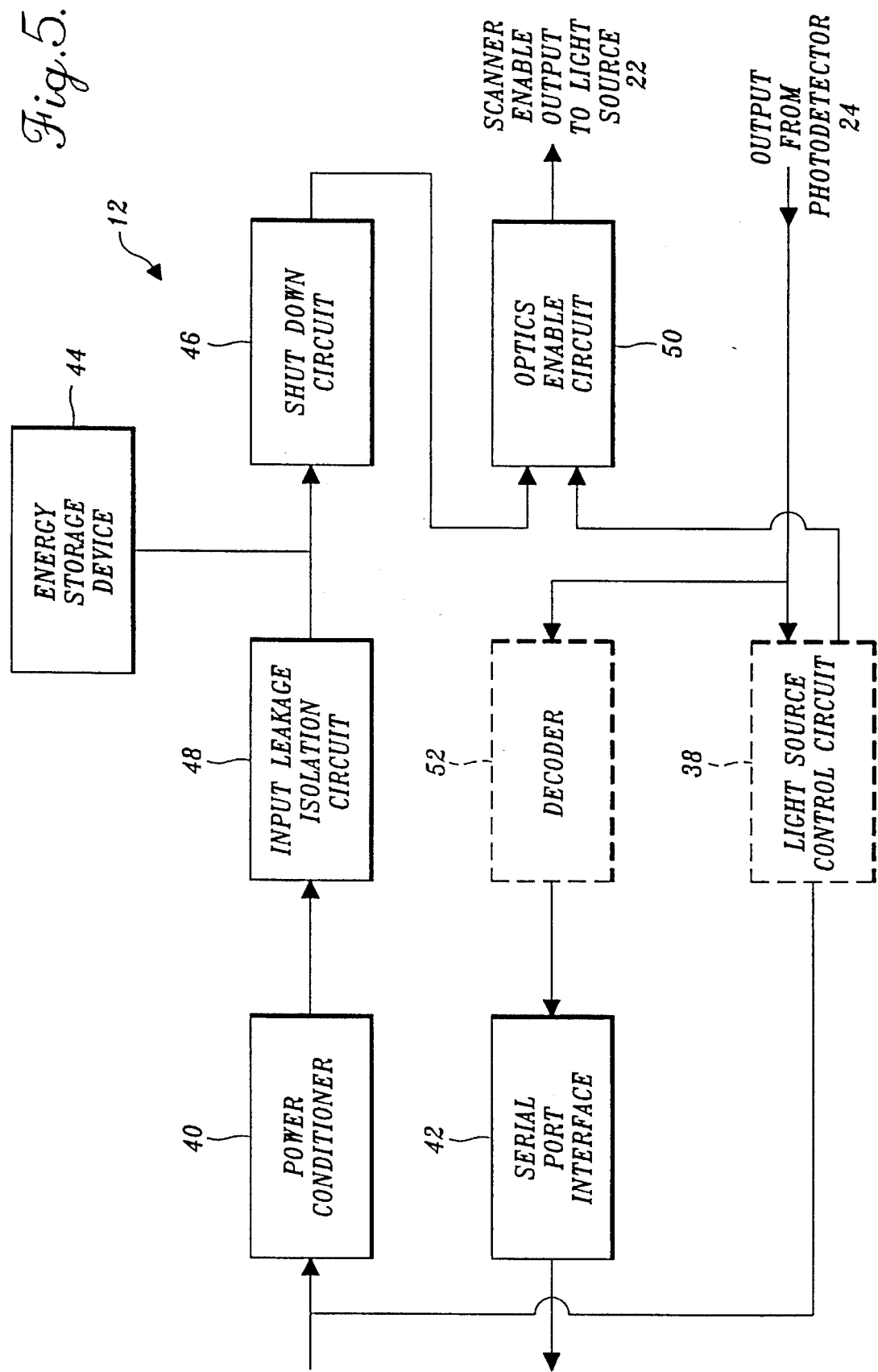
FIG. 5 is a block diagram of the interface shown in FIG. 1.

Turning finally to a discussion of the interface 12, interface 12 is included to couple the serial port 14 of computer 16 to the bar code scanner 18. Interface 12 is primarily responsible for providing power to the bar code scanner 18. As shown in FIG. 5, the interface 12 includes an optional light source control circuit 38, a power conditioner 40, serial port interface 42, energy storage device 44, output power shutdown circuit 46, input leakage isolation circuit 48, optics enable circuit 50 and an optional decoder 52.

Addressing these components individually, the light source control circuit 38, as mentioned above, is optional. In that regard, control circuit 38 can be used in place of a light source control circuit 26 in scanner 18 if and when the light source 22 is to be controlled during the nonscanning mode of operation to reduce power consumption. If the control circuit 38 is not employed, the optics enable circuit 50 is only regulated by the shutdown circuit 46, described in greater detail below.

Figure 6:
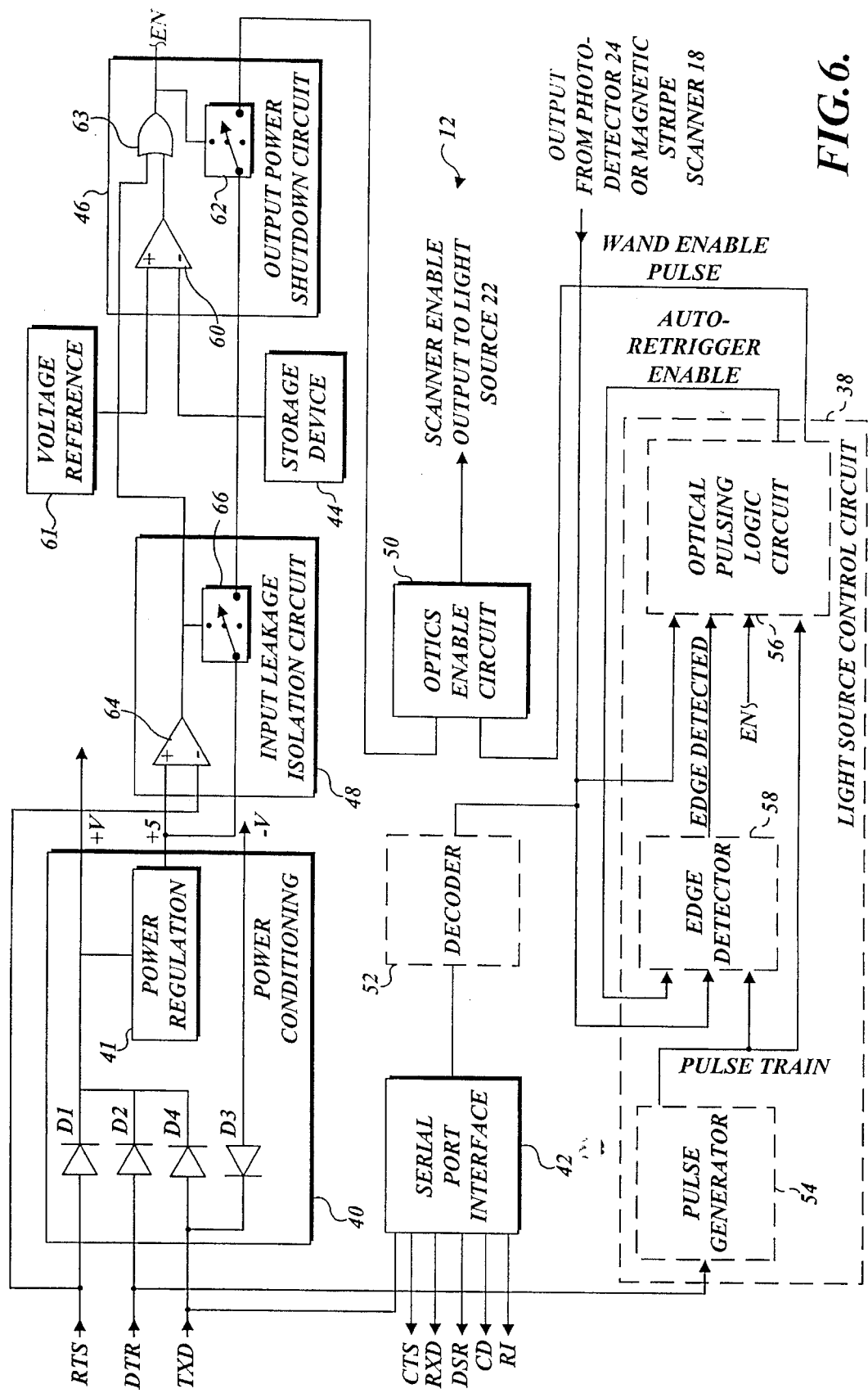
FIG. 6 is a more derailed block diagram of the interface shown in FIG. 5 illustrating, in particular, a number of features employed by the interface to control the delivery of power from the computer to the peripheral device.

In the preferred arrangement, however, the light control circuit 38 is part of interface 12 and includes a pulse generator 54, optical pulsing logic circuit 56, and an edge detector 58, as shown in FIG. 6. These components cooperatively control the operation of light source 22, via optics enable circuit 50, and photodetector 24 in the same manner as the light source control circuit 26 discussed above in connection with FIGS. 3 and 4.

Addressing now the more important components of interface 12 shown in FIG. 6, the power conditioner 40 receives milliampere-level currents from the RTS and DTR lines of serial port 14 and conditions them to provide on-board positive rail voltages ranging anywhere from plus five volts to plus fifteen volts. Similarly, power conditioner 40 receives and conditions current from the TXD line of serial port 14 to provide on-board negative rail voltages ranging from minus five to minus fifteen volts. These on-board rail voltages are filtered and used to drive the data signals sent by the interface 12 back to computer 16 on the RXD line of serial port 14. In addition, a reduction of the positive rail voltage is performed at regulator 41 to yield a five-volt supply line required to power the light source control circuit logic 38.

As shown in FIG. 6, power conditioner 40 also includes three diodes D1, D2, and D3 to protect various portions of the circuit under certain circumstances. More particularly, assume that a high signal is present on both the RTS and DTR lines of serial port 14. With the positive sides of diodes D1 and D2 connected to the RTS and DTR lines, as shown, diodes D1 and D2 will be forward-biased, allowing the high signals on the two lines to cooperatively form the positive rail voltage. In the event that the signal present on, for example, the RTS line goes low, however, diode D1 will become reverse-biased, preventing the high signal present on the DTR line from damaging the RTS line. Diode D2 similarly protects the DTR line in the event that the signal present on the DTR line goes low when the signal present on the RTS line is high. Diodes D1 and D2 further protect the remainder of interface 12 in the event that either, or both, of the signals on the RTS and DTR lines go low, by effectively isolating the interface 12 and the respective line or lines.

Like diodes D1 and D2, diode D3 is included to protect one of the serial port lines, as well as the interface 12. In that regard, the negative side of diode D3 is connected to the TXD line. As long as the signal on this line is low, diode D3 is forward biased and will allow the TXD line to provide the negative rail. In the event the signal present on the TXD line goes high, however, diode D3 will become reverse-biased and will isolate and protect the TXD line and remainder of the interface 12.

As shown in FIG. 6, the power conditioner 40 also includes a fourth diode D4. Diode D4 is included to allow the TXD line to temporarily contribute to the positive rail voltage under certain circumstances. As will be described in greater detail below, the RTS and DTR lines are responsible for powering the bar code scanner 18 by providing energy both directly to scanner 18 and, in some instances, to storage device 44 for later transfer to scanner 18. It takes some finite time, however, for the RTS and DTR lines to charge device 44 to a voltage sufficient to properly power the scanner 18. This time can be reduced by roughly 50 percent by temporarily providing a high signal on the TXD line, using it to add power to the positive rail until the storage device 44 is sufficiently charged. Diode D4 allows the positive current available from the high signal on the TXD line to flow to the positive rail, rather than the negative rail.

To understand the manner in which the TXD line is used to enhance the power available from the positive rail of power conditioner 40, it must first be recognized that the signal present on the TXD line of an "IBM-compatible" serial port is not a standard port bit and, therefore, cannot be explicitly set to a high value. The normal "at-rest" value of the signal on the TXD line is negative and it goes positive only during the high portions of a transmitted RS-232 character. As a result, the only way to provide the desired high signal on the TXD line is by using it for some sort of character transmission.

In an interrupt-based approach for producing the desired signal on the TXD line, a software driver resident in the memory of computer 16 detects when the storage device 44 is inadequately charged by, for example, monitoring a comparison of the stormed voltage and a reference voltage that is made by the shutdown circuit 46 and described in greater detail below. If device 44 is not sufficiently charged, the software driver will send a 0 hexadecimal character (0H) to the transmit buffer of the computer's serial port controller, which will subsequently cause this character to be transmitted via the TXD line. With the proper serial port parity setting, the resultant bit pattern will be all "zeroes" and will form a single high pulse, having a length that depends on the baud rate in effect. The software then enters a "wait" loop, allowing the RTS, DTR, and TXD lines to cooperatively and more rapidly charge the storage device 44.

In the event that the storage device 44 becomes sufficiently charged part way through this wait loop, the software controller will abort the loop. On the other hand, if the wait loop has been completed and the entire assigned character transmitted on the TXD line in this fashion, a "transmit buffer empty" interrupt is produced by serial port 14, indicating to the software driver that the character has been transmitted. If the storage device 44 is still not sufficiently charged, the software driver then sends another character to the serial port controller, repeating the process outlined above until the storage device 44 is charged.

As will be appreciated, it is eventually important to restore the TXD line to normal operation because, when the TXD line is used in the manner described above to provide a more powerful positive rail, the power conditioner 40 is unable to provide a negative rail voltage. Without the negative rail, scanning could not be performed because both positive and negative rail voltages are required to output a pulse train representative of the scanned data back to the serial port 14 of computer 16. However, a more sophisticated version of the interrupt-based scheme described above takes advantage of the fact that the demands on the negative rail are less severe than those on the positive rail.

In that regard, it is possible to continue sending the signal on the TXD line high for some fraction of time sufficient to augment the current available from the positive rail, while still providing ample current to the negative rail. For example, the hexadecimal bytes "AA" and "55" are both bit patterns of alternating "ones" and "zeroes." outputting either of these bytes will therefore reduce the current available on the negative rail by 50 percent, and increase the current available on the positive rail accordingly. Depending upon the relative power requirements of the two rails, other characters could be transmitted to achieve the desired distribution of power from the TXD line to the positive and negative rails.

As will be appreciated, although an interrupt-based approach is described above, polling and timing-based methods could also be employed. In the polling method, the software driver would examine the serial port 14 to determine if the previous character has finished transmitting. If it has, another character is transmitted. In the timing-based method, the software driver determines how long it will take for the character to transmit. The software driver then simply requests the transmission of another character.

Returning now to a discussion of the other components of serial port 14, the serial port interface 42 couples the scanner output signals from interface 12 to the inputs of the serial port 14 of the computer 16. Depending on whether a decoder is included with scanner 18 or interface 12, or is instead included as part of computer 16, the serial port interface 42 may transmit character-encoded data on the RXD line of serial port 14 or a pulse train corresponding to the bars and spaces in the bar code scanned on one of the handshake lines CTS, CD, RI or DSR.

The energy storage device 44 of interface 12 is included to allow the scanner 18 to operate properly, even if it requires more power during a scan than the serial port 14 can continuously provide. As previously described, the scanner's light source 22 may be completely deactivated or operated in a pulsed mode until the scanner 18 is positioned adjacent the white paper preceding a bar code to be scanned, at which time the light source 22 in scanner 18 is kept ON. As will be appreciated from, for example, FIG. 4C, scanner 18 thus requires some first level of power, $P_1$, when operated in the nonscanning mode and a higher level of power, $P_2$, when operated in the continuous scanning mode.

These power requirements of scanner 18 may have any one of three relationships to the power available from serial port 14. For example, the power available from serial port $P_S$ may be greater than both $P_1$ and $P_2$ (Case 1). In this situation, the serial port 14 is able to directly supply scanner 18 with all the power it needs, regardless of its mode of operation. As a result, the storage device 44 is not required.

Alternatively, the power $P_s$ available from serial port 14 may be greater than the power $P_1$ required by scanner 18 in the nonscanning mode, but less than the power $P_2$ required by scanner 18 in the scanning mode of operation (Case 2). In this situation, the serial port 14 cannot directly provide enough power to scanner 18 to ensure proper operation of scanner 18 when a scan is in progress. To overcome this limitation, the storage device 44 is included to store the energy from serial port 14 that is not required by scanner 18 when scanner 18 is operated in the nonscanning mode. The storage device 44 then supplements the energy available from serial port 14 during scanning by returning this stored energy to scanner 18 to make up for the energy deficiency that would otherwise occur when scanner 18 is in the scanning mode. The interface 12 finds perhaps its greatest applicability to this case.

As yet another alternative, the power $P_s$ available from the serial port may be less than the power $P_1$ or $P_2$ required by scanner 18 in either the nonscanning or scanning modes (Case 3). In this situation, it is still possible for the storage device 44 to store energy from serial port 14 if the scanner 18 is placed in a shutdown mode in which it draws no power from the serial port 14 at all. Then, with the storage device 44 sufficiently charged, energy from device 44 can be used to supplement the power provided by serial port 14 to operate scanner 18 in either the scanning or nonscanning modes.

Having reviewed the basic operation of storage device 44, its structure will now be briefly considered. In the preferred embodiment, storage device 44 comprises one capacitor, or a plurality of capacitors connected in parallel, with the positive terminal of the capacitor or capacitors coupled to the connection between the input power isolation circuit 48 and shutdown circuit 46 and the negative terminal of the capacitor or capacitors coupled to ground. As a result, the capacitors are coupled to the power transmission path between serial port 14 and scanner 18. The size and construction of the capacitors required is a function of the characteristics of serial port 14 as well as the relative power levels $P_1$, $P_2$, and $P_s$ involved.

As will be appreciated, other storage devices 44 could be employed, including, for example, a rechargeable or nonrechargeable battery or batteries. By supplementing battery power via the serial port 14, the battery requirements and, hence, scanner 18 size and weight can be reduced.

As noted, the output of the storage device 44 is directly connected between the serial port 14 and scanner 18. As a result, energy not required by scanner 18 is "automatically" stored by the storage device 44. Similarly, energy from storage device 44 is directly available to the light source 22. If desired, however, storage device 44 could be controllably coupled to the power transmission path between serial port 14 and scanner 18 by, for example, the light source control circuit 38. Thus, for example, circuit 38 could be constructed to selectively couple storage device 44 to the power transmission path in Cases 2 and 3 above, while disconnecting storage device 44 in Case 1 where it is not required.

Turning now to a discussion of the shutdown circuit 46, it is included to ensure that scanner 18 is operated only if accurate scans can be performed. If serial port 14 can directly supply the power required by scanner 18 in both the scanning and nonscanning modes of operation (Case 1), shutdown circuit 46 is not required. If, however, the scanner 18 requires more power than the serial port 14 can provide directly (Cases 2 and 3), the scanner 18 will not operate properly unless additional energy is available from storage device 44. Thus, shutdown circuit 46 is included to determine when storage device 44 is unable to ensure proper operation of scanner 18 and to inhibit the operation of scanner 18 in that event. As will be appreciated, the interface 12 would typically be constructed so that shutdown circuit 46 would only rarely be required to inhibit the operation of scanner 18, for example, when the same bar code is scanned repeatedly, and not during normal expected use.

The shutdown circuit 46 may be constructed in a variety of ways to ensure that adequate energy is available from storage device 44. For example, as shown in FIG. 6, the shutdown circuit 46 may include a voltage comparator 60, normally closed switch 62, and OR gate 63. Basically comparator 60 determines whether the voltage $V_c$ stored on a capacitive storage device 44 has fallen below some threshold level $V_{th1}$ required to ensure proper operation of scanner 18.

For the Case 2 embodiment, this is shown graphically in FIG. 4F. If the capacitor voltage $V_c$ falls below the threshold voltage $V_{th1}$ provided by a reference source 61, the comparator 60 provides an output through OR gate 63 to switch 62, opening switch 62 and preventing current from flowing to the light source 22 and other components of scanner 18. At this point, comparator 60 continues monitoring the capacitor voltage $V_c$. Once voltage $V_c$ rises to a second threshold voltage $V_{th2}$, the normally closed switch 62 is again closed, allowing scanner 18 to resume operation.

As an alternative to the use of comparator 60, circuit 46 may include a counter and timer. In this approach, the counter keeps track of the number of scans performed during a set interval of time, defined by the timer. If some predetermined count is exceeded, the normally closed switch 62 is opened, preventing scanner 18 from operating. This approach, however, is more complicated in that it requires initialization and resetting of the counter and timer.

As a third approach, a processor for performing one of a variety of conventional error detection schemes could be included in circuit 46. More particularly, the processor would monitor the photodetector output to determine whether the bar code data received is correct or whether it includes some error, indicating that the scanner 18 should be disabled. As a result, the normally closed switch 62 would be opened, inhibiting the operation of scanner 18. After a predetermined interval of time sufficient to allow recharging of the storage device 44, the normally closed switch 62 would then be closed.

Turning now to the input leakage isolation circuit 48, this circuit 48 is included to isolate storage device 44 from input leakage paths. As a result, the discharge of storage device 44 is minimized, reducing the charge-up time for the storage device 44 before the scanner 18 may be used.

To that end, the input leakage isolation circuit 48 includes a comparator 64 that determines, for example, when the computer 16 has been turned OFF, when the interface 12 has been disconnected from computer 16, or when the serial port 14 of computer 16 has been reconfigured. This is accomplished by comparing the input from serial port 14 to a reference voltage from the power conditioning block 40 to detect the absence of positive power on one or both of the RTS or DTR lines. Each of the three conditions monitored indicates that the scanner 18 cannot be immediately used to provide proper data to computer 16. As a result, the comparator 64 opens a normally closed switch 66, also included in circuit 48, to interrupt the input to storage device 44. Then, when computer 16 is turned back ON, interface 12 is reconnected, or serial port 14 reconfigured, the normally closed switch 66 will reconnect the input to storage device 44.

The shutdown circuit 46 also responds to drops in voltage occurring when the computer 16 has been turned OFF, when the interface 12 has been disconnected from computer 16, or when the serial port 14 of computer 16 has been reconfigured. More particularly, the output of the comparator 64 in isolation circuit 48 is applied to the OR gate 63 of shutdown circuit 46 to open the normally closed switch 62 under these conditions. As a result, the shutdown circuit 46 operates as an output leakage isolation circuit, isolating storage device 44 from output leakage paths. By virtue of the inclusion of OR gate 63 to couple the outputs of comparators 60 and 63 to switch 62, switch 62 remains closed and provides power to the optics enable circuit 50 only if the storage device 44 is adequately charged and leakage will not be a problem.

As will be appreciated from the preceding discussion, the input leakage isolation circuit 48 and shutdown circuit 46 cooperatively isolate storage device 44, ensuring that the energy stored by device 44 is preserved and minimizing the likelihood of, and length of time required for, an initial charge-up period. Otherwise, several minutes might be required to charge storage device 44 to a level that is sufficient to permit scanning to proceed. In addition, any energy previously drawn from the serial port 14 of computer 16 is not wasted.

As noted previously, the interface 12 may, as an alternative to computer 16 or scanner 18, include a decoder block 52. In that case, a train of electrical pulses corresponding to the bars and spaces in a scanned bar code is output by photodetector 24 to interface 12, where it is decoded by decoder 52 and converted to the applicable character-encoded format. The data in this format are then provided to the RXD line of serial port 14 by the serial port interface 42 of interface 12.

In summary, the disclosed interface 12 allows the peripheral 18 to be powered directly from the serial port 14 of a computer 16. In addition, the interface 12 is designed to allow the use of a peripheral 18 that requires more power, while in its high current consumption mode of operation, than the serial port 14 can directly provide. Further, the interface 12 limits the operation of peripheral 18 in situations that might result in improper operation and ensures that the interface 12 is ready for operation when the peripheral 18 is to be used.

Figure 7:
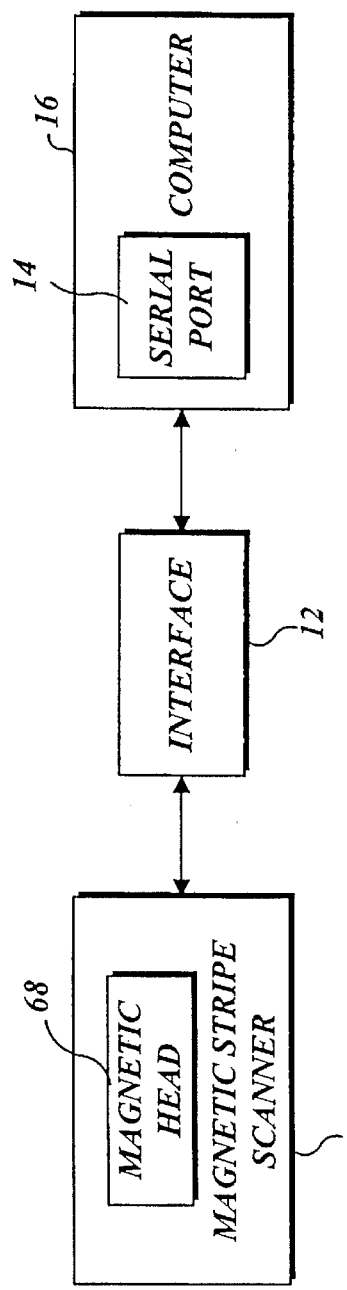
FIG. 7 is a block diagram of a system constructed in accordance with this invention in which the peripheral device is a magnetic stripe reader.

As noted previously, other peripherals 18, subject to operational limitations that are similar to those of the bar code scanner discussed above, may also be included in system 10. For example, as shown in FIG. 7, peripheral 18 may be a magnetic stripe scanner, which includes a magnetic head 68 for processing information that is magnetically coded upon magnetic strips. Like the bar code scanner, magnetic stripe scanner 18 may decode such information itself, or may rely upon interface 12 or computer 16 for decoding.

The magnetic stripe scanner 18 may also be designed to operate in several different modes. For example, scanner 18 may be operated in a nonscanning mode in which the scanner requires little or no power. Then, in response to the manual actuation of a switch by an operator, or in response to the sensed initiation of a magnetic stripe scan, the scanner 18 may be operated in a scanning mode at a higher power level.

As will be appreciated from the discussion of bar code scanners above, the interface 12 provides the requisite power to scanner 18, even when the scanning mode of operation requires more power than is continuously available. The interface 12 also passes the coded or decoded information contained on scanned magnetic stripes to computer 16 for processing.

Figure 8:
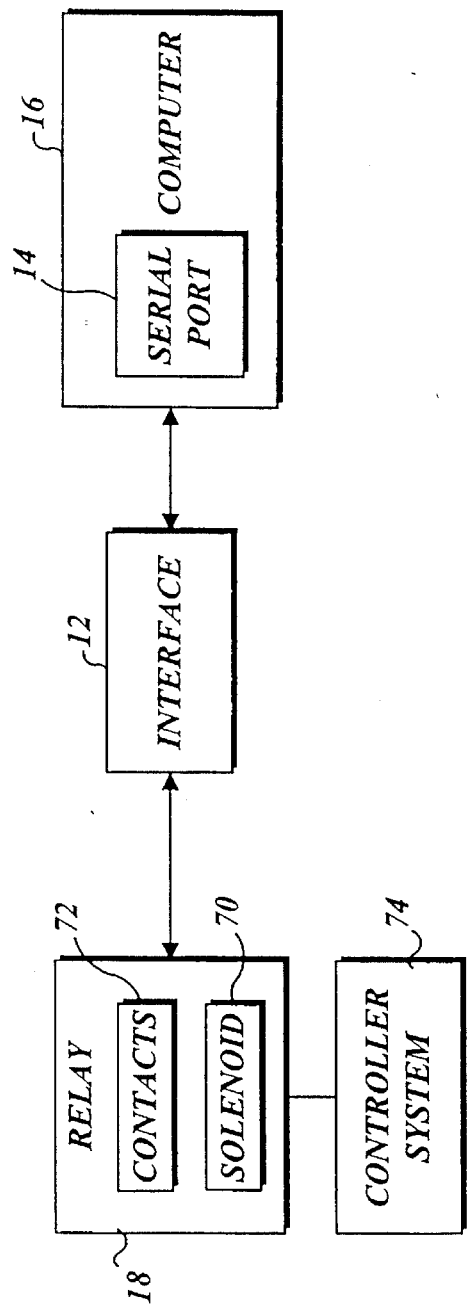
FIG. 8 is a block diagram of a system constructed in accordance with this invention in which the peripheral device is a relay.

In addition to input-type peripherals 18, such as the bar code and magnetic stripe scanners discussed above, interface 12 may be used with output-type peripherals that respond to signals produced by computer 16. As one example, reference is had to FIG. 8, in which the peripheral 18 is a latching-type relay.

As shown, the latching-type relay 18 has a coil or solenoid 70 that electromagnetically controls one or more sets of contacts 72 included in the power circuit of a controlled system 74. The state of the relay 18 and, hence, the open or closed position of contacts 72 can be changed by applying a pulse of energy to the relay solenoid 70 that is relatively small in comparison to the energy required by the controlled system 74. As a result, computer 16 can be used to control the power circuit and, thus, operation of the controlled system 74, while remaining electrically isolated therefrom.

In this arrangement, the solenoid 70 would require no energy until the state of relay 18 is to be changed. Thus, during this "nonactuation" interval, the storage device 44 in interface 12 would store energy. The stored energy could then be discharged by storage device 44 to solenoid 70 in response to an output from computer 16 on the output control line of serial port 12. As a result, relay 18 could be placed in an "actuation" mode, switching its output, even when more energy is required for switching than is continuously available from serial port 12.

Those skilled in the art will recognize that the embodiments of the invention disclosed herein are exemplary in nature and that various changes can be made therein without departing from the scope and the spirit of the invention. In this regard, as was previously mentioned, the interface 12 can be used with a variety of peripheral devices 18. In addition, where a scanner 18 is employed as the peripheral, although the decoder is preferably included in the computer and the light source control circuit is preferably included in the interface, the invention is not dependent upon the location of the decoder in either the scanner 18, interface 12, or computer 16, nor is it dependent upon the location or use of a light source control circuit. The invention is also not dependent upon the operational scheme of scanner 18. Further, as was noted, the energy storage device 44, shutdown circuit 46, and power isolation circuit 48 can be constructed in a variety of different ways. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. An interface, for coupling the serial port of a computer to a bar code scanner that requires energy, said interface comprising:

power transmission means for transferring substantially all of the energy required by the bar code scanner from the serial port to the bar code scanner; and data transmission means for transferring unformatted pulse data between the bar code scanner and the serial port for processing by the computer.

2. An interface, for coupling any general purpose port of a computer to a bar code scanner, said general purpose port having a plurality of signal lines, said interface comprising:

transmission means for transferring power required by the scanner to the scanner from at least one of the plurality of signal lines of the general purpose port, said transmission means including data transmission means for transferring unformatted data from the scanner into the general purpose port, for processing by the computer; and control means for controlling the transfer of power to the scanner from the general purpose port.

3. The interface of claim 2, wherein said control means further comprises energy storage means for storing energy in response to a first condition and for providing energy to the scanner in response to a second set of conditions.

4. An interface, for coupling the serial port of a computer to a magnetic stripe scanner that requires energy, said interface comprising:

power transmission means for transferring substantially all of the energy required by the magnetic stripe scanner from the serial port to the magnetic stripe scanner; and data transmission means for transferring unformatted pulse data between the magnetic stripe scanner and the serial port for processing by the computer.

5. The interface of claim 1, further comprising means for controlling the serial port, enabling it to accept the unformatted pulse data instead of serially formatted data.

6. The interface of claim 5, wherein the means for controlling the serial port enable it to receive the unformatted pulse data on an input line that is not used to receive the serially formatted data.

7. The interface of claim 2, wherein the general purpose port includes a plurality of data handshaking lines, including a clear to send (CTS) line, a data set ready (DSR) line, a carrier detect (CD) line, and a ring indicate (RI) line, further comprising means for controlling the general purpose port, enabling it to receive the unformatted data from the scanner on at least one of the data handshaking lines.

* * * * *